United States Patent
Iwamoto (10) Patent No.: US 9,260,574 B2
(45) Date of Patent: Feb. 16, 2016

(54) BARRIERS AND FILMS

(75) Inventor: Takashi Iwamoto, Urayasu (JP)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 713 days.

(21) Appl. No.: 13/514,036

(22) PCT Filed: Oct. 18, 2011

(86) PCT No.: PCT/US2011/056752
§ 371 (c)(1), (2), (4) Date: Jun. 5, 2012

(87) PCT Pub. No.: WO2013/058744
PCT Pub. Date: Apr. 25, 2013

(65) Prior Publication Data
US 2013/0091803 A1 Apr. 18, 2013

(51) Int. Cl.
| | |
|---|---|
| C08K 9/04 | (2006.01) |
| C08K 3/34 | (2006.01) |
| C08L 67/04 | (2006.01) |
| B65B 55/00 | (2006.01) |
| C08J 5/18 | (2006.01) |
| C08K 5/02 | (2006.01) |
| C08K 5/315 | (2006.01) |
| C08K 9/02 | (2006.01) |
| C08K 5/00 | (2006.01) |
| C08K 7/00 | (2006.01) |

(52) U.S. Cl.
CPC ... *C08J 5/18* (2013.01); *C08K 9/04* (2013.01); *C08J 2367/04* (2013.01)

(58) Field of Classification Search
None
See application file for complete search history.

(56) References Cited

U.S. PATENT DOCUMENTS

| | | | |
|---|---|---|---|
| 5,246,763 A | 9/1993 | Murschall et al. | |
| 5,436,353 A | 7/1995 | Chetcuti | |
| 5,446,073 A * | 8/1995 | Jonsson et al. | 522/104 |
| 6,127,447 A | 10/2000 | Mitry et al. | |
| 6,893,730 B2 | 5/2005 | Moulton et al. | |
| 2002/0156207 A1* | 10/2002 | Imuta et al. | 526/127 |
| 2003/0055179 A1* | 3/2003 | Ota et al. | 525/242 |
| 2004/0044094 A1* | 3/2004 | Garnett | 522/1 |
| 2006/0006378 A1* | 1/2006 | Hirai | 257/40 |
| 2006/0276607 A1* | 12/2006 | Ikenaga et al. | 526/348.6 |
| 2007/0049680 A1* | 3/2007 | Maruo et al. | 524/445 |
| 2009/0117294 A1* | 5/2009 | Omatsu et al. | 428/1.31 |
| 2009/0284134 A1* | 11/2009 | Iida et al. | 313/504 |

(Continued)

FOREIGN PATENT DOCUMENTS

| | | |
|---|---|---|
| CN | 101608023 A | 12/2009 |
| JP | 59-129261 | 7/1984 |

(Continued)

OTHER PUBLICATIONS

Asta et al., "Advanced Applications of Engineered Nanomaterials" *Material Matters*, Sigma-Aldrich Chemistry, Feb. 2009, pp. 1-27, vol. 2(1) (English Version).

(Continued)

*Primary Examiner* — Peter A Salamon
(74) *Attorney, Agent, or Firm* — Knobbe, Martens, Olson & Bear, LLP (57) ABSTRACT

Provided herein are various bathers and methods of making and using them. In some embodiments, the barriers include a porous crystalline charge-transfer complex and a filler.

27 Claims, 2 Drawing Sheets

(56) References Cited

U.S. PATENT DOCUMENTS

| | | | |
|---|---|---|---|
| 2009/0290100 A1* | 11/2009 | Haruta et al. | 349/75 |
| 2010/0210745 A1* | 8/2010 | McDaniel et al. | 521/55 |
| 2010/0233146 A1* | 9/2010 | McDaniel | 424/94.2 |
| 2011/0240064 A1* | 10/2011 | Wales et al. | 134/26 |

FOREIGN PATENT DOCUMENTS

| | | |
|---|---|---|
| JP | S59-129261 A | 7/1984 |
| JP | 61-281154 | 12/1986 |
| JP | 03-110712 | 5/1991 |
| WO | WO 00/35671 | 6/2000 |
| WO | WO 03/018642 | 3/2003 |
| WO | WO 2009/130302 | 10/2009 |

OTHER PUBLICATIONS

Asta et al., "Advanced Applications of Engineered Nanomaterials" *Material Matters*, Sigma-Aldrich Chemistry, Feb. 2009, pp. 1-27, vol. 2(1).

"Biodegradable plastics (primarily food packaging applications)", <http://www.tcn.zaq.ne.jp/kanno/public html/greenpla.htm>, in some form no later than Jul. 21, 2011. While no copy of the website as it existed on Jul. 21, 2011, is in Applicant's possession, Applicant has provided a copy of the website that was printed on Sep. 14, 2011; pp. 1-9.

"Discovered a New Molecule to Detect Different Absorption Behavior of the Electronic State—Development of Ultra-High Efficiency Separation of Oxygen and Nitrogen-," JST Joint Statement, National University Corporation Kyoto University, Independent Administrative Institution of Science and Technology Agency (JST), Synchrotron Radiation Research Institute Foundation, Riken, Jun. 7, 2010, pp. 1-7.

International Search Report and Written Opinion received in International Application No. PCT/2011/056752, dated Dec. 20, 2011, filed on Oct. 18, 2011.

"Multilayer Containers Featuring Nano-Nylon MXD6 Barrier Layers With Superior Performance and Clarity", Mitsubishi Gas Chemical Co. Inc.; pp. 1-10; Information was available for this document in some form no later than Jul. 21, 2011. While no copy of the document as it existed on Jul. 21, 2011, is in Applicant's possession, Applicant has provided a copy of the document that was printed on Sep. 30, 2011.

Polymer-nano-clay composite materials: http://www.sigmaaldrich.com/etchmedialib/countries/japan/materialscience/documents/mm2-1-.j.Par.0001.File.dat/MM2-1_J.pdf; Information was available at website: http://catalog.teijin.co.jp/template.phtml?id=147&pid=4&PHPSESSID=988662ee1c8e61e7f69f585303dceff5, in some form no later than Jul. 21, 2011. While no copy of the website as it existed on Jul. 4, 2012.

Shimomura et al., "Selective Sorption of Oxygen and Nitric Oxide by an Electron-Donating Flexible Porous Coordination Polymer", *Nature Chemistry*, pp. 1-11 (2010).

Shieh, et. al., "Curing of Unsaturated Polyester Resins: Effect of Surface Treatment of Particulates," Polymer Engineering and Science, Mar. 5, 1992, pp. 335-343, vol. 32(5).

Tamura, "24./Polymer Layered Silicate Nanocomposites," http://wwwsoc.nii.ac.jp/cssj2/seminar1/section24/text.html; NIMS Photocatalytic Materials Center, Tsukuba, Ibaraki Prefecture, Japan, in some form no later than Jul. 21, 2011. While no copy of the website as it existed on Jul. 21, 2011, is in Applicant's possession, Applicant has provided a copy of the website that was printed on Sep. 14, 2011.

Tokyo Chemical Industry Co. Ltd., Online Catalog, 2011, 1 page.

Tsai, "Preparation of Exfoliated Polyester/Clay Nanocomposites," http://onlinelibrary.wiley.com/doi/10.1002/adma.200401260/abstract, Advanced Materials, vol. 17(14), Jul. 2005, 1 page.

Triantafyllidis et al., "Epoxy-Clay Fabric Film Composites with Unprecendented Oxygen-Barrier Properties," Chem.. Mater., 18 (18), pp. 4393-4398, Aug. 4, 2006.

Yeh et al., "Oxygen Barrier and Blending Properties of Blown Films and Blends of Modified Polyamide and Polyamide-6 clay Mineral Nanocomposites," *Applied Clay Science* 45, pp. 1-7, (2009).

* cited by examiner

BARRIERS AND FILMS

CROSS-REFERENCE TO RELATED APPLICATIONS

This application is the U.S. National Phase filing under 35 U.S.C. §371 of International Application No. PCT/US2011/056752, filed on Oct. 18, 2011. The contents of the International Application are hereby incorporated by reference in its entirety.

FIELD

Disclosed herein are various compositions and films that relate generally to various protective barriers.

BACKGROUND

A variety of protective barrier materials and films exist. These barriers, in film form or other form, can be used in containers and/or packaging for protecting and preserving various materials (e.g., food products, etc.)

SUMMARY

In some embodiments, a resin composite is provided and can include an oxygen resistant filler and a porous crystalline charge-transfer complex that is on the surface of the filler. In some embodiments, a resin composite is provided and can include a filler and a porous crystalline charge-transfer complex that is on the surface of the filler. In some embodiments, the filler can be flaked. In some embodiments, the porous crystalline charge-transfer complex can include an organic acceptor, an organic donor, and a metal ion.

In some embodiments, a food-grade gas barrier film is provided and can include a porous crystalline charge-transfer complex and a flaked, oxygen resistant filler that is suspended within the porous crystalline charge-transfer complex. The gas barrier film can have a water vapor permeability of about 10 to about 70 g/m$^2$/day, and an oxygen permeability of about 0.2 to about 20 cc/m$^2$/day/atm.

In some embodiments, a method of preparing a resin is provided. The method can include providing an acceptor molecule, providing a metal ion, providing a donor molecule, providing a filler, and mixing the filler, the metal ion, the donor molecule, and the acceptor molecule together to form a resin.

In some embodiments, a method of preserving food is provided. The method can include providing a food-grade gas barrier film. The food-grade gas barrier film can include a porous crystalline charge-transfer complex and a flaked, oxygen resistant filler that is suspended within the porous crystalline charge-transfer complex. The gas barrier film can have a water vapor permeability of about 40 to about 70 g/m$^2$/day. The gas barrier film can have an oxygen permeability of about 0.2 and about 20 cc/m$^2$/day/atm. The method can further include covering a food item with the food-grade gas barrier film, thereby preserving the food.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Provided herein are various compositions, materials, and methods relating to various resins, barriers, and/or films. In some embodiments, the resins, barriers, and/or films include various optional resin components and a gas and/or vapor resistant component. In some embodiments, the filler can act as a barrier to a gas, such as oxygen. While the entire structure need not be made of or include the filler, the presence of the filler within another substance (such as suspended within a polymer component) can effectively reduce the likelihood or the speed at which a gas can pass through the material that includes the filler.

In some embodiments, the resins, barriers, and/or films include an oxygen resistant filler and a porous crystalline charge-transfer complex that is in contact with the filler. In some embodiments, the porous crystalline charge-transfer complex can include an organic acceptor, an organic donor, and a metal ion. In some embodiments, the porous crystalline charge-transfer complex acts to block a gas such as oxygen and/or a vapor such as water vapor. In some embodiments, the filler, when coated with a porous crystalline charge-transfer complex, together act to block a gas such as oxygen and/or a vapor such as water vapor.

Figure 1:
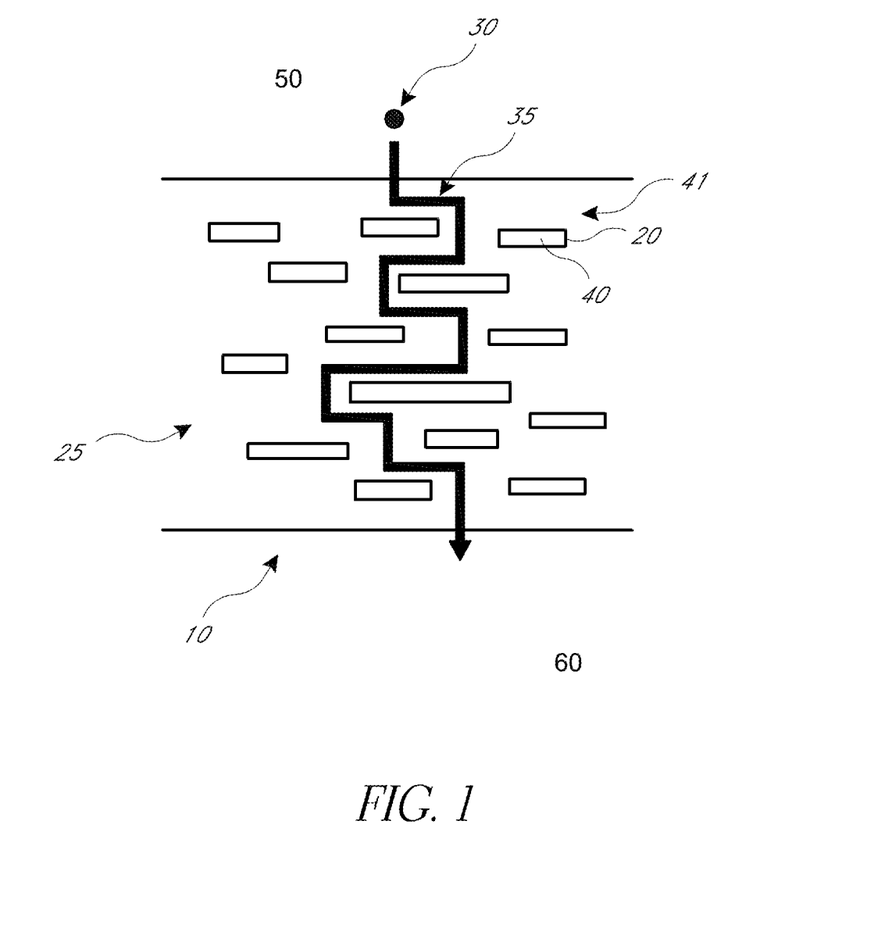
FIG. 1 is a depiction of some embodiments of a barrier.

Some examples of such embodiments are depicted in FIG. 1. As shown in FIG. 1, a resin composite 10, can include a porous charge-transfer complex coating ("coating") 20 over a filler 40. In some embodiments, the charge-transfer complex 20 can include a coating on the filler 40. Together, the charge-transfer complex 20 coated filler 40 can be referred to as a "charge-transfer coated filler particle" or a "coated filler" 41.

In some embodiments, the presence of the filler 40 and/or coating 20 reduces the likelihood or speed with which a foreign material 30, such as oxygen or water vapor, can pass through the resin composite. In some embodiments, this can be achieved by providing a longer flow path 35 within a material (such as a barrier or a film), so that the distance a foreign material (e.g., oxygen or water vapor molecule) 30 travels to get from an external side 50 to an internal side 60 is effectively increased. In some embodiments, this greater length also increases the chance that a foreign molecule on an external side 50, will also randomly exit to the external side 50 as well. In some embodiments, the resin composite also includes a polymer or resin component 25, which, in some embodiments, can suspend and/or separate the individual particles of the coated filler 41.

While not limiting, FIG. 1 displays an embodiment of a mechanism of foreign material permeation through some embodiments of a barrier. Given the teachings provided herein, it is understood that the gas permeability (including, e.g., permeability of other foreign materials) will decrease if the diffusion is hindered by a filler, a charge-transfer complex coated surface, or both (e.g., a charge-transfer complex coated filler) thereby making the permeation path longer.

In some embodiments, the barrier can include each of the following elements: 1) a filler (which can, but need not be, oxygen resistant), such as a mineral-nanoflake-structured filler (which can, in some embodiments, be synthesized from a layered clay mineral or synthesized artificially) and 2) a porous crystalline charge-transfer complex (which can, in some embodiments, be formed from an organic acceptor—organic donor—metal ion complex) that can be formed on the surface of the filler.

In some embodiments, a polymer can be added. In some embodiments, a resin composite is provided (which can, in some embodiments, be formed by kneading the coated filler). In some embodiments, the resin used includes, as well as PLA, a general-purpose resin for packaging such as nylon, polypropylene, PET, polyvinylidene chloride, and so forth. In some embodiments, by using PLA, in addition to the known effects of increased strength and improved moisture resistance of the filler, it is possible to impart oxygen barrier properties without laminating an inorganic metal film, thereby achieving a high-performance packaging material without compromising the biodegradability.

Filler and Charge-transfer Complex

While a variety of possible fillers can be used, in some embodiments, the fillers can include generated bentonite, montmorillonite, smectite or artificial smectite, and other such materials. In some embodiments, the filler can include plastic nanocomposites, such as nano-N-MXD6 (M9™) or N-MXD6 (Nanocor).

In some embodiments, the filler can be shaped as a flake. While this is not a requirement, it is noted that the flake aspect allows for a greater amount of surface area of the filler to act as a barrier within or along the surface of the barrier or film. As shown in FIG. 1, the longer flakes can allow for more overlap between flakes, creating a more effective barrier by increasing the path length for any foreign material 30.

In some embodiments the flakes have a length, width, or length and width between 0.1 nm and 1,000 nm e.g., 0.1, 1.2, 1, 10, 100, and 1,000 nm, including any range between any two of the preceding values, and any range above or below any one of the preceding values in thickness, and can have a depth (the dimension into the page of FIG. 1), length, or depth and length of between 1 nm and 100,000 nm, e.g., 1, 1.2, 10, 100, 1000, 10,000 and 100,000 nm, including any range between any two of the preceding values, and any range above or below any one of the preceding values.

In some embodiments, the filler can be any shape. In some embodiments, the filler is rectangular, spherical, conical, cylindrical, irregular, random, and/or porously configured. In some embodiments, the filler can be amorphous. In some embodiments, the filler can be crystalline in nature and shape.

In some embodiments, the filler is present at a density that is adequate to allow structural integrity of the barrier, while providing adequate blocking ability (alone, and/or in combination with the porous crystalline charge-transfer complex coating, and/or in combination with polymer and/or resin components in a film or barrier) so as to serve as a barrier against a desired external or internal compound or moiety (e.g., a "foreign molecule", such as oxygen or water vapor).

In some embodiments, the filler can be at least partially coated with a charge transfer complex. In some embodiments, the charge-transfer complex can be porous. In some embodiments, the charge-transfer complex can be crystalline. In some embodiments, the charge-transfer complex can be porous and crystalline. In some embodiments, at least 0.1% of a surface of the filler is coated. In some embodiments, 0.1, 0.2, 0.3, 0.4, 0.5, 1, 2, 3, 4, 5, 10, 20, 30, 40 50, 60, 70, 80, 85, 90, 91, 92, 93, 94, 95, 96, 97, 98, 99, 99.9% or more of the surface of the filler can be coated with a layer of the charge-transfer complex. In some embodiments, none of the filler is coated. In some embodiments, at least some of the filler is coated, for example, 0.1, 0.2, 0.3, 0.4, 0.5, 1, 2, 3, 4, 5, 10, 20, 30, 40 50, 60, 70, 80, 85, 90, 91, 92, 93, 94, 95, 96, 97, 98, 99, 99.9% or greater percentage of the filler particles can be coated or at least partially coated as noted above, including any range above any of the preceding values and any range defined between any two of the preceding values.

In some embodiments, the charge-transfer complex can have a thickness of about a monolayer of the complex. In some embodiments the charge-transfer layer is thicker and/or includes multiple layers. In some embodiments, the charge-transfer layer is at least 0.05 nm, e.g., 0.05, 0.06, 0.1, 0.5, 1, 10, 20, 30, 40, 50, 100, 200, 300 nm or more, including any range defined between any two of the preceding values and any ranges above or below any of the preceding values.

In some embodiments, any porous crystalline charge-transfer complex can be used. In some embodiments, any porous crystalline charge-transfer complex can be employed as long as a crystal lattice, which includes the metal ion in a sandwiched manner, is present. In some embodiments, the crystal lattice can be formed by reacting an acceptor organic molecule, such as tetracyanquinodimethane (TCNQ), trichloroethylene (TCE), Bis dithiobenzyl nickel etc. with a donor molecule, such as an aromatic nitrogen compound, such as bipyridyl, pyridine, quinoline or isoquinoline, or tetrathiafulvalene (TTF) etc., in the presence of metal ions (zinc, copper, iron, nickel, and so forth) having ligands.

In some embodiments, oxygen can be selectively adsorped where TCNQ is used as the acceptor, bipyridine is used as the donor, and zinc is used as the coordination metal. In some embodiments, the charge-transfer complex is optional. In some embodiments, if a gas or substance other than oxygen is to be blocked or suppressed, then one need not use the charge transfer-complex. In some embodiments, when oxygen is to be blocked, one can use the charge-transfer complex.

In some embodiments, the filler (or coated filler) can block at least some gas or other foreign material. In some embodiments, at least 1, 2, 3, 4, 5, 10, 15, 20, 25, 30, 40, 50, 60, 70, 80, 85, 90, 95, 96, 97, 98, 99, 99.9, 99.99, or 100% percent of the gas or foreign material can be blocked (e.g., will not pass through an individual filler particle).

In some embodiments, the filler (or coated filler) can retard the passage of the gas or other foreign material. In some embodiments, the filler (or coated filler) can retard the passage of gas or other foreign material by 1, 5, 10, 15, 20, 30, 40, 50, 60, 80, 100, 150, 200, 300, 500, 1000 percent or more, including any range defined between any two of the preceding values and any rage above any one of the preceding values. In some embodiments, the filler (or coated filler) can retard the passage of the gas or other foreign material by 2, 2, 3, 4, 5, 10, 15, 20, 50, 100, 1000, 10,000 fold or more. In some embodiments, blocking of gas permeation can increase about 200% by each 2% addition of the filler (e.g., montmorillonite). In some embodiments, this can be further increased by 10, 20, 30, 40, 50, 60, 70, 80, 90, 100, 110, 120, 130, 140, 150, 160, 170, 180, 190, 200 percent or more, including any range defined between any two of the preceding values and any range above any of the preceding values when a charge-transfer complex is also employed.

The term "foreign material" denotes a material that is not present in the barrier, filler, and/or resin layers. Examples of foreign materials include, for example, water vapor, $O_2$, microbes, viral particles, nitrogen, argon, bacteria, proteins.

The term "filler" denotes at least one particle as provided herein. When a specific particle is denoted, the term "filler particle" can be used. However, the term "filler" is generic and can be used to refer to the characteristics of a specific particle (as above when referencing some optional shapes of the filler) or a collection or population of filler particles (e.g., the resin composite can contain adequate filler for blocking X% of a gas). In some embodiments, the filler can be a nano-clay. In some embodiments, commercially available nano-clays can be used, for example, Southern Clay Products Cloisite® 10A Nanoclay can be used. In some embodiments, a filler can separate gases through a physical mechanism. In some embodiments, any filler having a "platelet" or flaked form can be employed. In some embodiments, the filler can include nano scale pores (e.g., 0.1, 0.2, 0.3, 0.5, 1, 2, 3, 4, 5, 6, 7, 8, 9, 10, 20, 30, 40, 50, 60, 80, 100, 120, 150, 200, 300, 400, 500, or 1000 nm size pores, including any range defined between any two of the preceding values and any range above or below any of the preceding values). In some embodiments, the filler includes montmorillonite clay and/or nano mica.

In some embodiments, the filler can be suspended in a polymer. In some embodiments, the polymer can be a polylactide (PLA) or a polylactide derivative.

In some embodiments, the flaked, oxygen resistant filler includes a mineral-nanoflake filler. In some embodiments, the mineral-nanoflake filler is and/or includes nano-clay. In some embodiments, the flaked, oxygen resistant filler is at least one of montmorillonite, bentonite, smectite, or artificial smectite, or a derivative thereof or product therefrom (such as delaminated montmorillonite, bentonite, smectite, or artificial smectite).

In some embodiments, the acceptor molecule can be or include at least one of tetracyanquinodimethane (TCNQ), trichloroethylene (TCE), or bis dithiobenzyl nickel. In some embodiments, any acceptor molecule can be employed, e.g., B2309 2,5-Bis(2-hydroxyethoxy)-7,7,8,8-tetracyanoquinodimethane; B1466 Bis(tetrabutylammonium); Tetracyanodiphenoquinodimethanide; D3200 2,5-Difluoro-7,7,8,8-tetracyanoquinodimethane; D2021 2,5-Dimethyl-7,7,8,8-tetracyanoquinodimethane; F0509 2-Fluoro-7,7,8,8-tetracyanoquinodimethane; T0077 Tetracyanoethylene; T1246 11,11,12,12-Tetracyanonaphtho-2,6-quinodimethane; T0078 7,7,8,8-Tetracyanoquinodimethane; T1131 Tetrafluorotetracyanoquinodimethane (purified by sublimation) [Organic Electronic Material]; T2468 Tetrathiafulvalene—7,7,8,8-Tetracyanoquinodimethane Complex; B1350 Bis(dithiobenzil)nickel(II); B1437 Bis(tetrabutylammonium); Bis(1,3-dithiole-2-thione-4,5-dithiolato)palladium(II); B1438 Bis(tetrabutylammonium) Bis(1,3-dithiole-2-thione-4,5-dithiolato)platinum(II); B1221 Bis(tetrabutylammonium) Bis(1,3-dithiole-2-thione-4,5-dithiolato)zinc Complex [Organic Electronic Material]; B1371 Bis(tetrabutylammonium) Bis(maleonitriledithiolato) nickel(II) Complex; D2134 Dioctadecyldimethylammonium Bis(1,3-dithiole-2-thione-4,5-dithiolato)aurate(III); T1272 Tetrabutylammonium Bis(1,3-dithiole-2-thione-4,5-dithiolato)nickel(III) Complex; T1415 Tetrabutylammonium Bis(maleonitriledithiolato)nickel(III) Complex; T1416 Tetrabutylphosphonium Bis(1,3-dithiole-2-thione-4,5-dithiolato) nickel(III) Complex; or T0279 (Toluene-3,4-dithiolato)zinc (II). In some embodiments, the acceptor includes an organic molecule. In some embodiments, the acceptor includes an inorganic molecule. In some embodiments, the organic acceptor is present in a resin composite, barrier, or film at about 0.01 to 1% by volume, e.g., 0.01, 0.05, 0.1, 0.2, 0.3, 0.4, 0.5, 0.7, 0.8, 0.9, or 1% by volume, including any range defined between any two of the preceding values. In some embodiments, the acceptor is present in a resin composite, barrier, or film at about 0.01 to 1% by volume, e.g., 0.01, 0.05, 0.1, 0.2, 0.3, 0.4, 0.5, 0.7, 0.8, 0.9, or 1% by volume, including any range defined between any two of the preceding values.

In some embodiments, the donor molecule can be or include at least one of bipyridine, pyridine, quinoline, isoquinoline, or tetrathiafulvalene (TTF). In some embodiments, any donor can be used, for example, B1200 Bis(ethylenedithio)tetrathiafulvalene [Organic Electronic Material]; B1299 Bis(ethylenedithio)tetrathiafulvalene-d8 [Organic Electronic Material]; B1218 Bis(methylenedithio)tetrathiafulvalene [Organic Electronic Material]; B1244 Bis(trimethylenedithio)tetrathiafulvalene [Organic Electronic Material]; D2067 Dimethyltetrathiafulvalene; F0285 Formyltetrathiafulvalene; T1571 Tetrakis(ethylthio)tetrathiafulvalene [Organic Electronic Material]; T1119 Tetrakis(methylthio)tetrathiafulvalene [Organic Electronic Material]; T1143 Tetrakis(octadecylthio)tetrathiafulvalene [Organic Electronic Material]; T1205 Tetrakis(pentylthio)tetrathiafulvalene [Organic Electronic Material]; T0980 Tetrathiafulvalene; T1377 Tetrathiafulvalene-d4; T2468 Tetrathiafulvalene-7,7,8,8-Tetracyanoquinodimethane Complex; or T1282 Tris(tetrathiafulvalene) Bis(tetrafluoroborate) Complex. In some embodiments, the donor includes an organic molecule. In some embodiments, the donor includes an inorganic molecule. In some embodiments, the donor is present in a resin composite, barrier, or film at about 0.01 to 1% by volume, e.g., 0.01, 0.05, 0.1, 0.2, 0.3, 0.4, 0.5, 0.7, 0.8, 0.9, or 1% by volume, including any range defined between any two of the preceding values.

In some embodiments, the metal ion is at least one of zinc, copper, iron, or nickel. In some embodiments, any transition metal can be used. In some embodiments, any metal that can be used in the above manner can be employed. In some embodiments, the metal is present in the resin composite, barrier, or film at about 0.01 to 1% by volume, e.g., 0.01, 0.05, 0.1, 0.2, 0.3, 0.4, 0.5, 0.7, 0.8, 0.9, or 1% by volume, including any range defined between any two of the preceding values.

In some embodiments, the ratio of donor to metal ion is approximately 1 to 1, e.g., the metal is present in about 60% to 140% of the donor. However, in some embodiments, larger differences are envisioned as well (e.g., 10% to 1000%). In some embodiments, the ratio of acceptor to metal ion is approximately 1 to 1, e.g., the metal is present in about 50% to 150% of the donor. However, in some embodiments, larger differences are envisioned as well (e.g., 10% to 1000%). In some embodiments, the ratio of donor to acceptor is approximately 1 to 1, e.g., the metal is present in about 60% to 140% of the donor. However, in some embodiments, larger differences are envisioned as well (e.g., 10% to 1000%).

In some embodiments, the metal ion coordinates at least one donor molecule and at least one acceptor molecule to provide a complex. In some embodiments, the complex provides a porous crystalline charge-transfer complex. In some embodiments, the structure is adequately crystalline so as to allow charge transfer to occur, for example, with oxygen. In some embodiments, the filler is within, on, and/or adjacent to the porous crystalline charge-transfer complex. In some embodiments, the metal ion coordinates two or more donor molecules with two or more acceptor molecules.

The amount of the filler in the resin can vary depending upon the desired properties of the barrier and/or the properties of the filler and thickness of filler. In some embodiments, filler is present at about 0.1 to 30% by Volume, for example, 0.5, 1, 2, 3, 4, 5, 6, 7, 8, 9, 10, 15, 20, 25, or 30%, including any range between any two of the preceding values. In some embodiments, the flaked, oxygen resistant filler is present at about 0.1% to about 10% by volume, for example 1-5% by volume.

Film/Barrier

In some embodiments, the filler and coating can be combined to provide a film and/or barrier. In some embodiments, the film can be a food-grade gas barrier film. In some embodiments, this can include a porous crystalline charge-transfer complex and a flaked, oxygen resistant filler that is suspended within the porous crystalline charge-transfer complex.

In some embodiments, the barrier can have a water vapor permeability of about 0 to about 200 $g/m^2/day$, e.g., 0, 1, 2, 3, 4, 5, 10, 15, 20, 30, 40, 50, 60, or 70 $g/m^2/day$, including any range defined between any two of the preceding values and above any one of the preceding values. In some embodiments, the barrier can have a water vapor permeability of about 10 to about 70 $g/m^2/day$.

In some embodiments, the barrier can have an oxygen permeability of about 0 to about 200 $cc/m^2/day/atm$, e.g., 0, 0.01, 0.02, 0.05, 0.1, 0.2, 0.4, 0.6, 1, 2, 3, 4, 5, 10, 15, or 20 $cc/m^2/day/atm$, including any range defined between any two of the preceding values and above any one of the preceding values. In some embodiments, the barrier can have an oxygen permeability of about 0.2 to about 20 $cc/m^2/day/atm$. In some embodiments, the values can be the same or similar for other gases, such as nitrogen or argon.

In some embodiments, the barrier can have any of the above water permeability properties combined with any of the above oxygen vapor permeabilites, e.g., the barrier can have an oxygen permeability of about 0.2 to about 20 $cc/m^2/day/atm$ and a water vapor permeability of about 10 to about 70 $g/m^2/day$.

In some embodiments, the food-grade barrier includes polylactide as a suspension polymer. In some embodiments, the polylactide is present in an amount at least equal to an amount of the filler. In some embodiments, the polylactide is present in an amount at least equal to an amount of the flaked, oxygen resistant filler. In some embodiments, less polylactide is present.

In some embodiments, the porous crystalline charge-transfer complex includes tetracyanquinodimethane. In some embodiments, the porous crystalline charge-transfer complex includes pyridine.

In some embodiments, any of the fillers provided herein can be employed. In some embodiments, flaked, oxygen resistant filler is employed and it can include nano-clay or a nano-clay derived material.

In some embodiments, the coated filler is employed in a food-grade gas barrier film, which can be a nontransparent film. In some embodiments, the coated filler is employed in a food-grade gas barrier film, which can be a transparent film. In some embodiments, the coated filler is employed in a food-grade gas barrier film, which can be a semitransparent film. In some embodiments, the film can be transparent and exhibit a bluish tint under visible light.

In some embodiments, the coating or the porous crystalline charge-transfer complex is present in an amount of at least 2 percent by weight of the barrier or film. In some embodiments, the coating is at least 2, 3, 4, 5, 6, 7, 8, 9, 10, 11, 12, 13, 14, 15, 20, 25, 30, 35, 40, 50, 60 or 70 percent by weight of the barrier or film, including any range above any of the preceding values and any range defined between any two of the preceding values.

Methods of Preparation and Use

In some embodiments, a method of preparing a resin is provided. The method can include providing an acceptor molecule, providing a metal ion, providing a donor molecule, providing a filler, and mixing the filler, the metal ion, the donor molecule, and the acceptor molecule together. In some embodiments, this is combined to form a resin.

In some embodiments, the various materials provided herein can be employed to provide an oxygen-barrier polymeric film. The film can include a porous structure of a charge-transfer complex that is configured by coordinating acceptor molecules, e.g., TCNQ, etc., with a metal ion and a donor molecule, e.g., bipyridine, on the surface of a filler, e.g., nano-clay. In some embodiments, the nanoclay filler can include a delaminated, layered clay mineral, such as montmorillonite, etc. This can then be kneaded in with a resin, to produce an oxygen barrier resin composite.

In some embodiments, the method can include dispersing and mixing the nano-clay (or more generally the filler) in with a resin. This can be performed so as to disperse the filler in the resin. In some embodiments, this allows one to provide a barrier film having an oxygen blocking characteristic. In some embodiments, this allows one to provide a film having a foreign material blocking characteristic.

The filler can be mixed into the resin in a number of ways, for example, an in-situ polymerization process, such as those used for nylon. In some embodiments, this involves a process in which the nano-clay (or more generally filler) is dispersed in a monomer and polymerization is conducted subsequently by adding a polymerization catalyst. In some embodiments, the method can involve a resin kneader to perform the kneading.

In some embodiments, the filler can be combined with the acceptor, donor, and metal ion before being added to the resin. In some embodiments, the acceptor, donor, and/or metal ion are combined with, prior to, or after the addition of the filler. In some embodiments, the acceptor molecule is at least one of tetracyanquinodimethane (TCNQ), trichloroethylene (TCE), or bis dithiobenzyl nickel. In some embodiments, the donor molecule is at least one of bipyridine, pyridine, quinoline, isoquinoline, or tetrathiafulvalene (TTF).

In some embodiments, the metal ion is at least one of zinc, copper, iron, or nickel. In some embodiments, the filler is at least one of nano-clay. In some embodiments, the nano-clay is obtained by delaminating a layered clay mineral. In some embodiments, this is done prior to the addition of the donor, acceptor or metal ion. In some embodiments, the layered clay mineral is at least one of montmorillonite, bentonite, smectite, or artificial smectite.

In some embodiments, the method further involves spreading the resin composite to form a film and/or a thin barrier.

In some embodiments, the method further includes polymerizing the resin composite by adding at least one polymerization catalyst. In some embodiments, polymerization is performed until complete. In some embodiments, polymerization is performed for as long as required so as to achieve the desired structural characteristics of the barrier or film.

In some embodiments, a resin kneader is used to perform the mixing. In some embodiments, the mixing is performed by hand.

In some embodiments, a method of preserving food is provided. In some embodiments, the method can include providing a food-grade gas barrier film. While any of the filler based embodiments provided herein can be employed, in some embodiments, the food-grade gas barrier film can include a porous crystalline charge-transfer complex and a flaked, oxygen resistant filler that is suspended within the porous crystalline charge-transfer complex. The gas barrier film can have a water vapor permeability of about 40 to about 70 g/m²/day. The gas barrier film can have an oxygen permeability of about 0.2 and about 20 cc/m²/day/atm. The gas barrier film can have a water vapor permeability of about 0.1 to about 70 g/m²/day. The gas barrier film can have an oxygen permeability of about 0.002 and about 20 cc/m²/day/atm. The method can further include covering a food item with the food-grade gas barrier film, thereby preserving the food. In some embodiments, the film is placed in direct contact with the food item. In some embodiments, the film is not placed in direct contact with the food item.

Additional Embodiments and Definitions

One of skill in the art will appreciate that the oxygen and/or water vapor embodiments also describe and contemplate embodiments in which the filler blocks or retards other foreign materials (such as other gases, microbes, biological materials, liquids, vapors, etc.) In addition, while additional detail has been provided on keeping foreign materials (including gases and water vapor) out of something, the present embodiments can just as readily be used for keeping something in (e.g., such as nitrogen for the treatment of meat products or water vapor for keeping some material moist).

As used herein, the term "oxygen resistant coated filler" denotes a material that can slow down the passing of oxygen through or within it. In some embodiments, the material slows down oxygen as it is relatively impermeable to oxygen (in comparison to one or more surrounding structures), thus preventing or reducing the speed or likelihood that an oxygen molecule can pass through the material. In some embodiments, the material acts as a sink or trap to oxygen, thereby preventing or reducing the amount of free oxygen.

Figure 2:
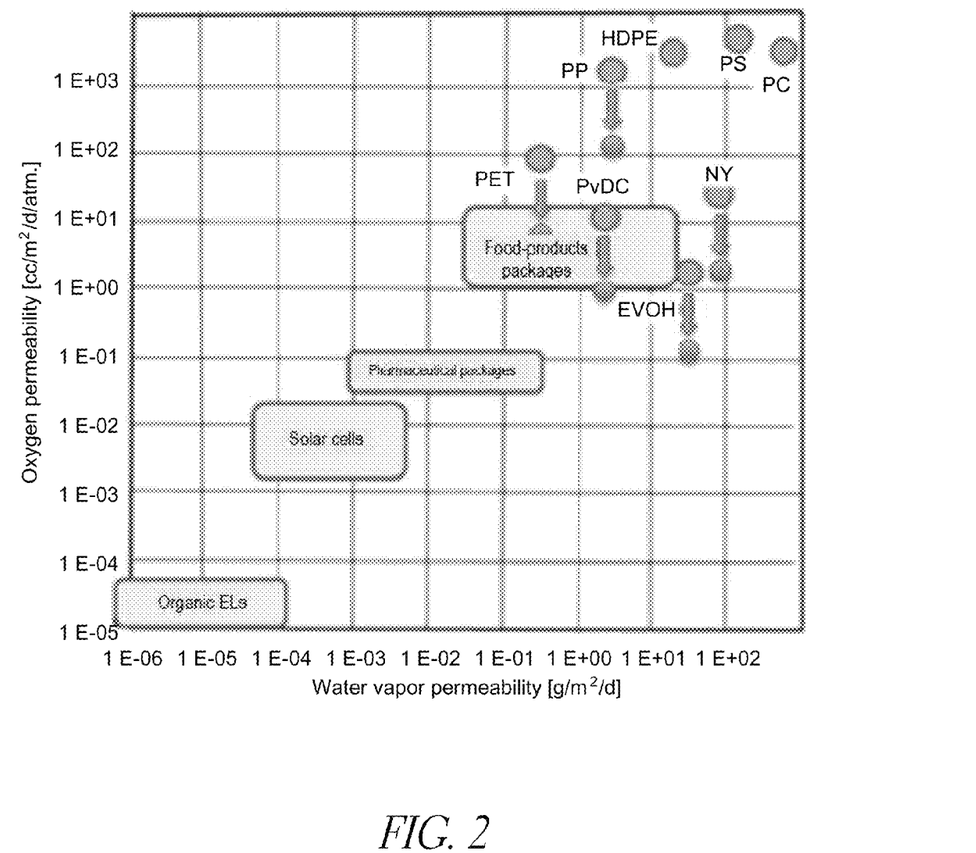
FIG. 2 is a graph displaying various oxygen permeability and water vapor permeabilities of various materials and various barriers.

In some embodiments, the embodiments provided herein can be applied to or in food-product packaging, organic ELs, solar cells, electronic paper, pharmaceutical packaging, and so forth. For example, organic ELs are highly susceptible to moisture and oxidation, a performance level of, for example, $10^{-4}$ to $10^{-6}$ g/m²/day in terms of water vapor permeability is required. Additional examples of levels of the oxygen barrier properties in several areas are illustrated in FIG. 2. The barrier properties of various existing plastics are also summarized in Table 1.

TABLE 1

Gas permeability of currently available plastic films.

| Film | $O_2$ cc/m² · 24 hr (24 μ) | $CO_2$ cc/m² · 24 hr (24 μ) | $H_2O$ g/m² · 24 hr (24 μ) |
|---|---|---|---|
| EVOH-32 | 0.4* | | 40-70** |
| PVDC | 10-110 | 60-700 | 3-6 |
| PVC | 80-320 | 320-790 | 5-6 |
| PET | 95-130 | 240-400 | 20-24 |
| PA6 | 30 | | 90 |
| PP | 2,500 | 9,100 | 3-5 |
| HDPE | 2,900 | 228 | 22 |
| PS | 5,500 | 14,000 | 110-160 |
| PC | 4,700 | 17,000 | 170 |

*20° C. · 65% RH
**47° C. · 90% RH

As indicated in FIG. 2 and Table 1, there are not a large number of options of existing resins that have the above identified properties. For example, polyvinylidene chloride has a level that can barely meet the minimum requirements for food-product packaging. In some embodiments, the various barriers and/or fillers provided herein can meet one or more of the noted applications with a high and/or higher reliability than, for example polyvinylidene chloride. In addition, in some embodiments, one or more of the barriers and/or fillers can be incorporated into a product so as to provide safer food-product packaging materials.

In some embodiments, one or more of the fillers or barriers provided herein can be employed in a plastic material (polymer, composite), transparent deposited film, and/or as a polymer with improved barrier properties.

In some embodiments, the film and/or barrier can be 20 μm thick and have an oxygen permeability of 0.2 cc/m²/day/atm. In some embodiments, the film can be 1, 2, 3, 4, 5, 6, 7, 8, 9, 10, 12, 14, 16, 18, 20, 25, 30, 40, 50, 60, 70, 80, 100, 200, 500, 1000, 10,000 or 100,000 micrometers thick, including any range above or below any one of the preceding values and any range defined between any two of the preceding values. In some embodiments the oxygen permeability can vary as desired, based upon the amount and nature of the coated filler and/or resin.

In some embodiments, a high-oxygen-barrier polymeric film can further increase its oxygen barrier properties by including a filler (or coated filler) having high gas barrier properties. In some embodiments, the high-oxygen-barrier polymeric film can be applied to or in various applications, such as application to food products, pharmaceutical packaging, solar cells, and so forth.

In some embodiments, the resin composite, film and/or barrier can be used for containers and packaging for preserving food products in conjunction with increasing safety awareness in food products. In some embodiments, the resin composite, film and/or barrier can take into consideration environmentally desired aspects, such as a use for containers and packaging in sustainable materials, which do not depend on fossil resources.

In some embodiments, provided herein are embodiments that can provide a balance of barrier protection and environmentally conscious sustainable materials. In some embodiments, this can take into account a variety of aspects, such as the following: an oxygen barrier property, a moisture barrier property, protection against mildew, microorganisms, and viruses, and protection against ultraviolet radiation. In some embodiments, one or more of these aspects can be addressed by the resin composite, film and/or barrier provided herein.

In some embodiments, the presently disclosed resin composite, film and/or barrier allows one to form a complete film without any pin-holes. In some embodiments, this allows one to reduce the intrusion of oxygen and/or humidity through pin-holes that might be present in other types of films or barriers. In some embodiments, the present resin composite, film, and/or barrier avoids or minimizes the use of aluminum, so as to avoid the use of large-scale energy consumption involved in smelting. Thus, some embodiments of the resin composite, film, and/or barrier, packaging aspects provided herein can be environmentally friendly. In some embodiments, provided herein is a resin composite, film, and/or barrier for packaging food products, that has a more effective oxygen barrier ability, that is an organic material which is not a hetero-junction material, (e.g., such as a metal foil—polymer film laminate), and/or that can be produced with low energy consumption. In some embodiments, one or more of the above aspects is addressed by a barrier provided herein. In some embodiments, the barrier provided herein does not need to address any of the above noted aspects.

In some embodiments, oxygen permeability employing a coated filler can be extrapolated/inferred from the information in Table 1. As shown in Table 1, the oxygen permeability of EVOH32 is 0.4 cc/m²·24 hr. In addition, as described herein, the coated filler can show about a 50% reduction in oxygen permeability with an added amount of about 2%, due to extension of the gas-flow path. In some embodiments, the gas permeability of the polymer depends on dissolution, diffusion, and permeation of the gas into the polymer. In some embodiments, with a layered silicate/polymer coated filler, the dispersed filler particles can have a high aspect ratio and can be considered to exhibit a barrier effect. In some embodiments, because the presence of filler particles within the matrix lengthens the diffusion path and reduces the cross-sectional area available for diffusion, diffusiveness on the macro-scale is reduced. Such an improvement of the gas barrier property as a relative gas permeability, P', can be expressed with the following approximation:

$$P'=P_c/P_p=\phi_p/1+(l/2t)\phi_f.$$

where $P_c$ is the gas permeability of the composite material, $P_p$ is the gas permeability of the polymer, $\phi_p$ is the volume fraction of the polymer, $\phi_f$ is the volume fraction of filler, l is the length of the filler, and t is the thickness of the filler.

According to this expression, the higher the aspect ratio of the added filler is and the higher the volume fraction of the filler is, the lower the gas permeability of the composite system becomes. For example, it has been reported that with a PA6☐ montmorillonite nano-composite film having a thickness of 30 μm, addition of only 2 wt % of montmorillonite reduces the oxygen permeability by approximately 50% (at 23° C.). It is understood that this change in the barrier property will occur in many kinds of packaging materials and industrial materials.

In some embodiments, the resin composite, film, and/or barrier can be non-toxic and/or appropriate for food items. In some embodiments, this is not required. For example, in some non-food embodiments, one can use EVOH in the barrier. When EVOH is applied, it is understood that an improvement of about 50% of that shown in Table 1 can occur with dispersive addition of a small amount of filler.

In the case of the other film materials generally used in food-product packaging, such as polypropylene, vinyl chloride, PET, and so forth, in accordance with the above expression, the oxygen permeability with the dispersed coated filler can be 50% or less of that without the coated filler. In some embodiments, it can be 50, 45, 40, 35, 30, 25, 20, 15, 10, 5, 4, 3, 2, 1, 0.1, 0.01 percent or lower, compared to what it is without the coated filler.

In some embodiments, a further improved oxygen permeability can be achieved by roughening the surface of the filler particles for actively adsorbing oxygen onto the clay surface. In some embodiments, this can provide a benefit in addition to the effect of reducing the gas permeability by extension of the flow-path length. In some embodiments, the adsorption mechanism can employ the charge transfer between oxygen and the porous crystalline charge-transfer complex. In some embodiments, the adsorptivity can be eventually lowered if adsorption sites are occupied. In some embodiments, they may eventually be saturated. However, this is generally not a practical concern, given that the surface area of the filler can be large.

In some embodiments, the resin composite, film and/or barrier displays an improvement of a gas barrier property by an order of at least one, if not two orders of magnitude, over a barrier or film that lacks the coated filler. For example, in some embodiments, there can be an improvement of 1.1, 2, 3, 4, 5, 6, 7, 8, 9, 10, 11, 12, 13, 14, 15, 16, 17, 18, 19, 20, 30, 40, 50, 60, 70, 80, 90, 95, 98, 99, or 100 fold over that of the material that lacks a coated filler.

FIG. 2 is a graph, which depicts some embodiments of expected values for the improvement in the gas barrier properties of the exemplified film; these are shown as circles at the end of the point of the arrow.

As described above, because some of the embodiments provided herein can be applied to any resin, film, or barrier in which the filler can be dispersed, a comparison can be made between the expected improvements in the gas barrier properties of resins of the same type. Some embodiments provide a method for obtaining improved oxygen gas barrier properties of a level allowable for food-product packaging. In some embodiments, this can be used even in a film in which it is difficult to impart oxygen gas barrier properties, such as a PET film. Thus in some embodiments, provided herein are PET based films with enhanced oxygen barrier properties, which can contain the filler and/or coated filler.

While not required, it is noted that, in some embodiments, the resin composite, film, and/or barrier can be transparent or transparent to some extent. In some embodiments, the resin composite, film, and/or barrier can provide an aesthetically pleasing film for packaging food items. In some embodiments, the resin composite, film, and/or barrier can be adequately transparent so that someone who would like to examine the food, can do so visually, without removing the resin composite, film, and/or barrier material.

In some embodiments, such as a polymer composite film in which the TCNQ complex is adsorbed on the filler, absorption due to the TCNQ complex in the transparent film is estimated to appear in the ultraviolet region at about 370 nm and in the visible range of about 550 to 600 nm. Considering that the molecular absorption coefficient of the TCNQ complex is generally about 80,000 to 100,000, the amount of the filler to be added is about 2 vol %, the amount of TCNQ complex adsorbed on the filler can be 0.1 vol % (because it is molecular adsorption onto the surface only, the values can be much smaller than these), and a molecular formula (in this case of the TCNQ complex, which is $C_{43}H_{25}N_{10}Zn$, with a molecular weight of 747), and a specific gravity of about 1.1 g/cc, the absorbance in the visible range can be calculated as follows:

(0.02×0.001×1.1/747)×100,000=0.0029.

Thus, from the above calculation, an embodiment of the film described above should be a light blue-clear film. The above approach can be used to determine and/or customize the color of other resin composites, films, and/or barriers.

EXAMPLE 1

Method of Coating Fillers

The present example outlines a method of creating a coated filler. Delaminated and thinly layered nano-clay from montmorillonite is dispersed in a methanol/benzene solvent mixed 1:1. The nano-clay is dispersed to approximately 500 mg/100 ml. Zinc nitrate at 1 mmol is then dissolved in the dispersion. The LiTCNQ and bipyridine, at 2 mmol and 1 mmol, respectively, are dissolved in 100 ml of methanol/benzene solvent mixed 1:1. This solution is slowly added to the nanoclay dispersed-zinc nitrate solution of at room temperature in a nitrogen atmosphere. The product is filtered, washed, and then dried, thereby obtaining coated filler particles in which a porous crystalline charge-transfer complex is formed on the surface of the filler.

EXAMPLE 2

Method of Preparing a Polymer Mix

The present example outlines a method of including a coated filler in a polymer mix. The coated filler particles above are combined with an equal amount of lactide. The two ingredients are mixed and a catalytic and thermolytic ring-opening of the lactide is performed in order to provide the polylactide polymer. The polymer will suspend the coated filler particles, as shown in FIG. 1.

EXAMPLE 3

Method of Applying a Coated Filler Based Film

The present example outlines a method of using a film that includes a coated filler. A film that includes a mineral-nanoflake filler, polylactide, and tetracyanquinodimethane (TCNQ) coordinated with bipyridine via a zinc ion is provided. The film is wrapped around an entire item of food a sufficient number of times so that the wrapping effectively covers all of the surface area of the item of food. The film then serves to reduce the amount of oxygen that comes into contact with item of food. The item of food will then take longer before it spoils than a comparable item of food wrapped in a film that lacks the coated filler.

EXAMPLE 4

Method of Applying a Coated Filler Based Film

The present example outlines a method of using a film that includes a coated filler. A film that includes a filler, polylactide, and trichloroethylene (TCE) coordinated with pyridine via a copper ion is provided. The film is wrapped around an entire item of food a sufficient number of times so that the wrapping effectively covers all of the surface area of the item of food. The film then serves to reduce the amount of water vapor that escapes from the item of food. The item of food will then retain more of its moisture than a comparable item of food wrapped in a film that lacks the coated filler.

EXAMPLE 5

Method of Determining an Amount of Coated Filler to Employ

The present example outlines a method of determining an amount of coated filler for a specific desired barrier property. A first amount of coated filler that includes tetracyanquinodimethane (TCNQ), bipyridine, and zinc, coated on delaminated montmorillonite is put into a resin for suspension in a first amount of polylactide. The resin suspension is spread out to a first thickness and polymerized into a first film. A first amount of oxygen is applied to a first side of the film, for a first amount of time, and the amount of oxygen that passes through to the second side of the film is determined. This can be done either by measuring the amount of oxygen (or gas) remaining on the first side, or by detecting a change in oxygen (or gas) on the second side. The process can then be repeated with varying amounts of the coated filler to determine what amount provides the desired oxygen (or other gas) barrier properties. Alternatively, the process can be employed to determine optimal film thickness and/or desired pairings with particular polymer and/or resin components.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., " a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

I claim:

1. A resin composite comprising:
   a flaked, oxygen resistant filler; and
   a porous crystalline charge-transfer complex that is on the surface of the filler, wherein the porous crystalline charge-transfer complex comprises:
   an organic acceptor;
   an organic donor; and
   a metal ion,
   wherein the organic acceptor, the organic donor, and the metal ion are present in amounts sufficient to form the porous crystalline charge-transfer complex on the surface of the filler.

2. The resin composite of claim 1, wherein the flaked, oxygen resistant filler comprises a mineral-nanoflake filler.

3. The resin composite of claim 1, further comprising polylactide.

4. The resin composite of claim 1, wherein the acceptor molecule is at least one of tetracyanquinodimethane (TCNQ), trichloroethylene (TCE), or bis dithiobenzyl nickel.

5. The resin composite of claim 1, wherein the metal ion is at least one of zinc, copper, iron, or nickel.

6. The resin composite of claim 1, wherein the flaked, oxygen resistant filler is at least one of nano-clay.

7. The resin composite of claim 1, wherein the flaked, oxygen resistant filler is at least one of montmorillonite, bentonite, smectite, or artificial smectite.

8. The resin composite of claim 1, wherein the flaked, oxygen resistant filler is contained within the porous crystalline charge-transfer complex.

9. The resin composite of claim 1, wherein the flaked, oxygen resistant filler is present at about 1% to about 5% by volume.

10. The resin composite of claim 1, wherein the organic acceptor is present at about 0.1% by volume.

11. A food-grade gas barrier film comprising a resin composite according to claim 1, wherein the flaked, oxygen resistant filler is suspended within the porous crystalline charge-transfer complex, wherein the gas barrier film has a water vapor permeability of about 10 to about 70 $g/m^2/day$, and wherein the gas barrier film has an oxygen permeability of about 0.2 to about 20 $cc/m^2/day/atm$.

12. The food-grade gas barrier film of claim 11, further comprising polylactide.

13. The food-grade gas barrier film of claim 12, wherein polylactide is present in an amount at least equal to an amount of the flaked, oxygen resistant filler.

14. The food-grade gas barrier film of claim 11, wherein the porous crystalline charge-transfer complex comprises pyridine.

15. The food-grade gas barrier film of claim 11, wherein the flaked, oxygen resistant filler comprises nano-clay.

16. The food-grade gas barrier film of claim 11, wherein the food-grade gas barrier film is a transparent film.

17. The food-grade gas barrier film of claim 11, wherein the porous crystalline charge-transfer complex is present in an amount of at least 2 percent by weight.

18. A method of preparing a resin composite according to claim 1, the method comprising:
   obtaining a resin;
   obtaining an acceptor molecule;
   obtaining a metal ion;
   obtaining a donor molecule;
   obtaining a filler; and
   mixing the filler, the metal ion, the donor molecule, the acceptor molecule and the resin together to form the resin composite.

19. The method of claim 18, wherein the acceptor molecule is at least one of tetracyanquinodimethane (TCNQ), trichloroethylene (TCE), or bis dithiobenzyl nickel.

20. The method of claim 18, wherein the donor molecule is at least one of bipyridine, pyridine, quinoline, isoquinoline, or tetrathiafulvalene (TTF).

21. The method of claim 18, wherein the metal ion is at least one of zinc, copper, iron, or nickel.

22. The method of claim 18, wherein the filler is at least one of nano-clay.

23. The method of claim 22, wherein the nano-clay is obtained by delaminating a layered clay mineral.

24. The method of claim 23, wherein the layered clay mineral is at least one of montmorillonite, bentonite, smectite, or artificial smectite.

25. The method of claim 18, further comprising spreading the resin composite to form a film.

26. The method of claim 18, further comprising polymerizing the resin by adding at least one polymerization catalyst.

27. A method of preserving food, the method comprising:
   providing a food-grade gas barrier film according to claim 11; and
   covering a food item with the food-grade gas barrier film, thereby preserving the food.

* * * * *

UNITED STATES PATENT AND TRADEMARK OFFICE
CERTIFICATE OF CORRECTION

| | | |
|---|---|---|
| PATENT NO. | : 9,260,574 B2 | Page 1 of 1 |
| APPLICATION NO. | : 13/514036 | |
| DATED | : February 16, 2016 | |
| INVENTOR(S) | : Iwamoto | |

It is certified that error appears in the above-identified patent and that said Letters Patent is hereby corrected as shown below:

On the Title Page, in Item (57), under "ABSTRACT", in Column 2, Line 1, delete "bathers" and insert -- barriers --, therefor.

In the Specification

In Column 1, Line 7, delete "§371" and insert -- § 371 --, therefor.

In Column 7, Line 1, delete "Volume," and insert -- volume, --, therefor.

Signed and Sealed this
Thirty-first Day of May, 2016

Michelle K. Lee
*Director of the United States Patent and Trademark Office*